(12) United States Patent
Diaconu et al.

(10) Patent No.: US 11,044,312 B2
(45) Date of Patent: Jun. 22, 2021

(54) STORAGE SEGMENT SERVER COVERED CACHE

(71) Applicant: Microsoft Technology Licensing, LLC, Redmond, WA (US)

(72) Inventors: Cristian Diaconu, Kirkland, WA (US); Vikram Wakade, Sammamish, WA (US); Krystyna Reisteter, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 123 days.

(21) Appl. No.: 16/138,340

(22) Filed: Sep. 21, 2018

(65) Prior Publication Data

US 2020/0099745 A1    Mar. 26, 2020

(51) Int. Cl.
*H04L 29/08*    (2006.01)

(52) U.S. Cl.
CPC ...... *H04L 67/1097* (2013.01); *H04L 67/2842* (2013.01)

(58) Field of Classification Search
CPC ............ H04L 67/1097; H04L 67/2842; G06F 11/1464; G06F 11/1453; G06F 11/2097; G06F 11/1471; G06F 11/2046
See application file for complete search history.

(56) References Cited

U.S. PATENT DOCUMENTS

| | | | |
|---|---|---|---|
| 7,085,999 B2 | 8/2006 | Maeda et al. | |
| 7,219,309 B2 | 5/2007 | Kaasila et al. | |
| 7,886,221 B1 | 2/2011 | Underwood et al. | |
| 9,514,007 B2 | 12/2016 | Gupta et al. | |
| 2012/0278704 A1 | 11/2012 | Ying et al. | |
| 2012/0323849 A1* | 12/2012 | Garin, Jr. | G06F 16/27 707/617 |
| 2013/0124968 A1 | 5/2013 | Dontcheva et al. | |

(Continued)

OTHER PUBLICATIONS

Artail, et al., "Device-Aware Desktop Web Page Transformation for Rendering on Handhelds", In Journal of Personal and Ubiquitous Computing, vol. 9, Issue 6, Sep. 27, 2005, pp. 368-380.

(Continued)

*Primary Examiner* — Philip C Lee
(74) *Attorney, Agent, or Firm* — Workman Nydegger

(57) ABSTRACT

A storage segment server environment that includes storage segment server(s) that cover a contiguous address space of data. The storage segment server has storage segments that are contiguous and that matches the address space of a respective of storage segments in the cloud store service. Thus, a read of the contiguous address spaces of the data from the cloud store service may instead be handled as a single read of the contiguous address space of the storage segment server. Each storage segment server(s) may be assigned to a range within the total contiguous address space of the data. Each storage segment server(s) includes a respective storage segment write component that is configured to perform write operations to storage segments in the respective storage segment server. Each storage segment server(s) also includes a respective cloud storage write component that initiates corresponding write operations to the cloud store service.

19 Claims, 6 Drawing Sheets

(56) References Cited

U.S. PATENT DOCUMENTS

| | | |
|---|---|---|
| 2013/0198134 A1 | 8/2013 | Akulavenkatavara et al. |
| 2013/0212487 A1 | 8/2013 | Cote |
| 2013/0332700 A1* | 12/2013 | Kopylovitz ........... G06F 3/0631 |
| | | 711/209 |
| 2015/0178253 A1 | 6/2015 | Kim et al. |
| 2018/0260125 A1* | 9/2018 | Botes .................... G06F 16/275 |

OTHER PUBLICATIONS

"International Search Report and Written Opinion Issued in PCT Application No. PCT/US19/039092", dated Oct. 9, 2019, 11 Pages.

* cited by examiner

STORAGE SEGMENT SERVER COVERED CACHE

BACKGROUND

A variety of services are now offered in a cloud computing environment. "Cloud computing" is a model for enabling ubiquitous, on-demand network access to a shared pool of configurable computing resources (e.g., networks, servers, storage, applications, and services). A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. One type of software as a service ("SaaS") is known as database as a service (DBaaS).

Conventional DBaaS is typically implemented within an architecture that includes one primary compute node and one or more secondary compute nodes (each node often provided as a virtual machine). The primary compute node operates a database server and has a directly attached solid state drive that the primary database server may read from and write to. Secondary compute nodes also operate the database server and also have a solid-state drive that the respective secondary database server may read from and write to. The data on the primary compute node is synchronized with the secondary compute nodes.

The secondary compute nodes provide redundancy with the aim of meeting service availability objectives. If the primary compute node was to fail, failover of the database may occur by promoting one of the secondary compute nodes to the primary compute node, and instantiating an additional secondary compute node to maintain the desired level of redundancy.

In order to synchronize the data at the primary compute node with the data at the secondary compute nodes, communication is required from the primary compute node to the secondary compute nodes. The primary compute node keeps a log of operations that occur at the primary compute node. The primary compute node may send the log records (either individually or as a block) to the secondary computing nodes. The secondary compute nodes each apply the operations specified by the primary compute node, and acknowledges such back to the primary compute node. Once the primary compute node receives such an acknowledgement back from a quorum (say two out of three secondary compute nodes), the primary compute node has synchronized its data with the secondary compute nodes to a degree that if the primary compute node goes down, there is a guaranty that a majority of the secondary compute systems will have the log record applied. Thus, in case of recovery, even if the newly elevated primary compute node had not yet applied the log record, that newly elevated primary compute node may still update itself with the current data by consulting with the other secondary compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a storage segment server environment that includes one or more storage segment servers that cover a contiguous address space of user data (such as perhaps a database). The storage segment server has respective storage segments that are contiguous in an address space and that matches the address space of a respective of storage segments in the cloud store service. Thus, a read of the contiguous address spaces of the data from the cloud store service may instead be handled as a single read of the contiguous address space of the storage segment server. In the case of there being multiple storage segments servers, each storage segment server may be assigned to a range within the total contiguous address space of the data.

The storage segment server, or each of the multiple storage segment servers if there are multiple of such servers, includes a respective storage segment write component that is configured to perform write operations to each of the respective storage segments in the respective storage segment server. The storage segment server, or each of the multiple storage segment servers if there are multiple of such servers, also includes a respective cloud storage write component that initiates corresponding write operations to the cloud store service and verifies completion of the corresponding write operations to the cloud store service. The cloud store write component also keeps track of which operations that have been performed on the storage segments on the storage segment server, but for which the corresponding operation has not yet been verified as complete in the cloud store service. Thus, the storage segment server(s) includes the most updated version of the data, but that data eventually propagates to the cloud store service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to a storage segment server environment that includes one or more storage segment servers that cover a contiguous address space of user data (such as perhaps a database). The storage segment server has respective storage segments that are contiguous in an address space and that matches the address space of a respective of storage segments in the cloud store service. Thus, a read of the contiguous address spaces of the data from the cloud store service may instead be handled as a single read of the contiguous address space of the storage segment server. In the case of there being multiple storage segments servers, each storage segment server may be assigned to a range within the total contiguous address space of the data.

The storage segment server, or each of the multiple storage segment servers if there are multiple of such servers, includes a respective storage segment write component that is configured to perform write operations to each of the respective storage segments in the respective storage segment server. The storage segment server, or each of the multiple storage segment servers if there are multiple of such servers, also includes a respective cloud storage write component that initiates corresponding write operations to the cloud store service and verifies completion of the corresponding write operations to the cloud store service. The cloud store write component also keeps track of which operations that have been performed on the storage segments on the storage segment server, but for which the corresponding operation has not yet been verified as complete in the cloud store service. Thus, the storage segment server(s) includes the most updated version of the data, but that data eventually propagates to the cloud store service.

First, an example environment that includes a primary compute system, secondary compute system(s), and the storage segment server environment will be described with respect to FIGS. 1 through 5. Then, the storage segment server environment will be described in further detail with respect to FIG. 6. Then, because components described herein may operate by a computing system, a computing system will then be described with respect to FIG. 7.

Figure 1:
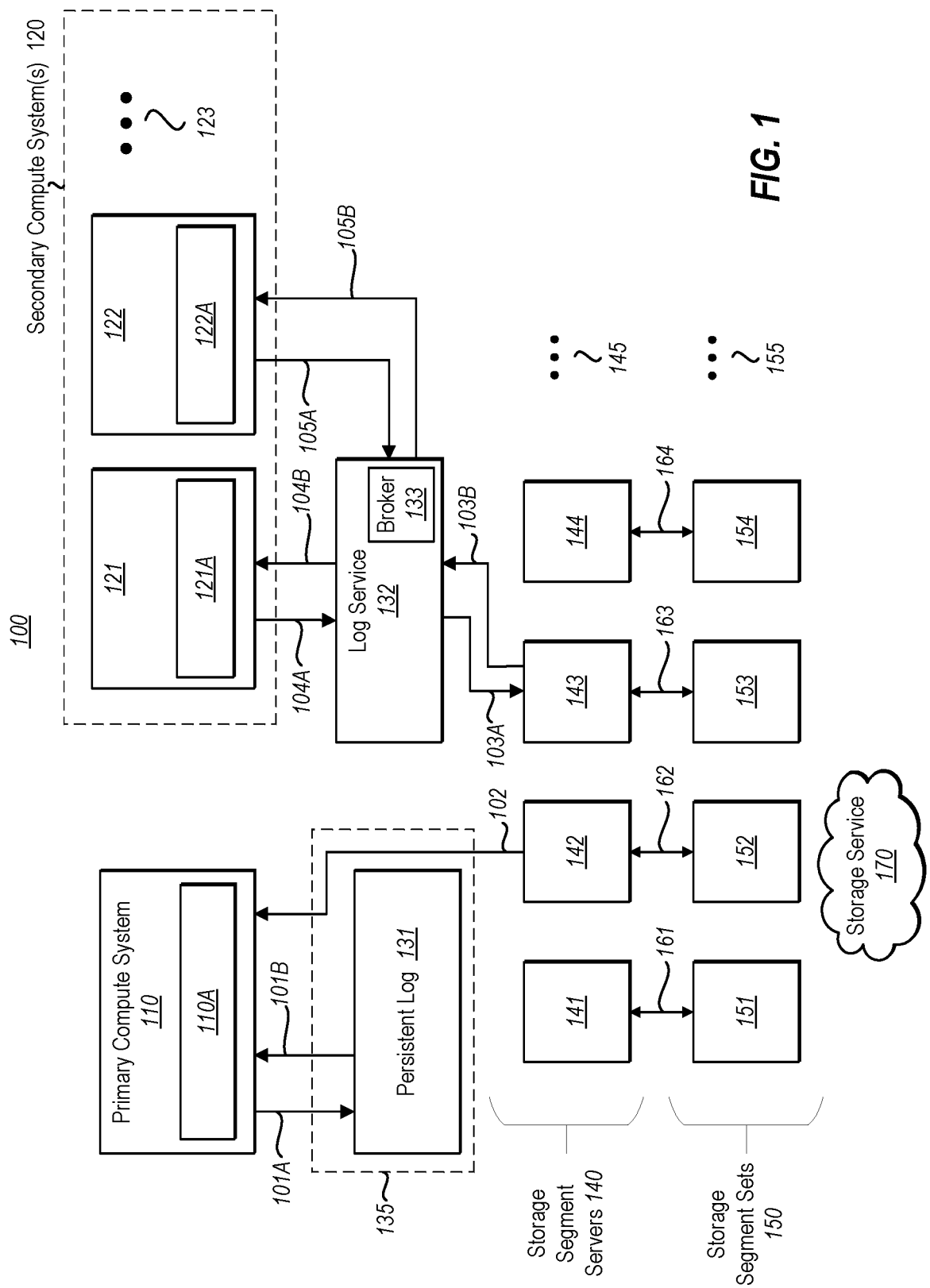
FIG. 1 illustrates an environment in which the principles described herein may be employed, which includes a primary compute system, one or more secondary compute systems, storage segment servers across which data is stored, a persistent log, and a log service for applying log records generated by the primary compute system.

FIG. 1 illustrates an environment 100 in which the principles described herein may be employed. As an example only, the environment 100 may be a network, such as perhaps a cloud computing environment. The environment 100 includes a primary compute system 110 that operates thereon an application 110A. As an example, the application 110A may be a database server application. The primary compute system 110 may be a physical computing system (such as a compute node in a cloud computing environment), in which case the primary compute system 110 may be structured as described below with respect to the computing system 700 of FIG. 7. Alternatively or in addition, the primary compute system 110 may be a virtual machine that emulates a computing system. The application 110A running on the primary compute system 110 performs write operations against user data. For instance, if the application 110A is a database server, the user data would be the database.

The environment 100 also includes secondary compute systems(s) 120. Each of the secondary compute system(s) 120 operates a corresponding application, which may be an instance of the very same application that is being run on the primary compute system 110. For instance, if the application 110A on the primary compute system 110 was a database server application, an instance of the database server application may be run on each of the secondary compute system(s) 120. The secondary compute system(s) 120 may each be a physical computing system (such as a compute node in a cloud computing environment), in which case the secondary compute system may be structured as described below with respect to the computing system 700 of FIG. 7. Alternatively or in addition, each secondary compute system(s) 120 may be a virtual machine that emulates a computing system.

The secondary compute system(s) 120 may include any number of secondary compute systems. In the illustrated embodiment, there are two secondary compute systems 121 and 122 illustrated, each operating a respective application 121A and 122A. The ellipsis 123 represents that the principles described herein are not limited to the number of secondary compute system(s) 120. Should the primary compute system 110 fail such that recovery is not efficiently possible, one of the secondary compute system(s) 120 would be promoted to be the new primary compute system, thus allowing that promoted compute system to perform write operations. Thus, the secondary compute system(s) 120 allows for there to be built-in redundancy within the environment 100. If a secondary compute system is promoted to be the primary compute system, a new secondary compute system may be started in order to replace the promoted compute system and thereby retain a desired number of secondary compute system(s) 120. On the other hand, secondary compute systems may be added or removed from the set of secondary compute system(s) at will independent of whether the primary compute system 110 has failed.

When the primary compute system 110 performs write operations to user data (e.g., a database), the primary compute system 110 logs (as represented by arrow 101A) those data operations into a persistent log 131. The persistent log 131 is kept so that the environment 100 may recover in case of a failure. The process of the primary compute system 110 writing to a storage segment (e.g., a page of user data), while persistently logging that write operation, will now be described.

Figure 2:
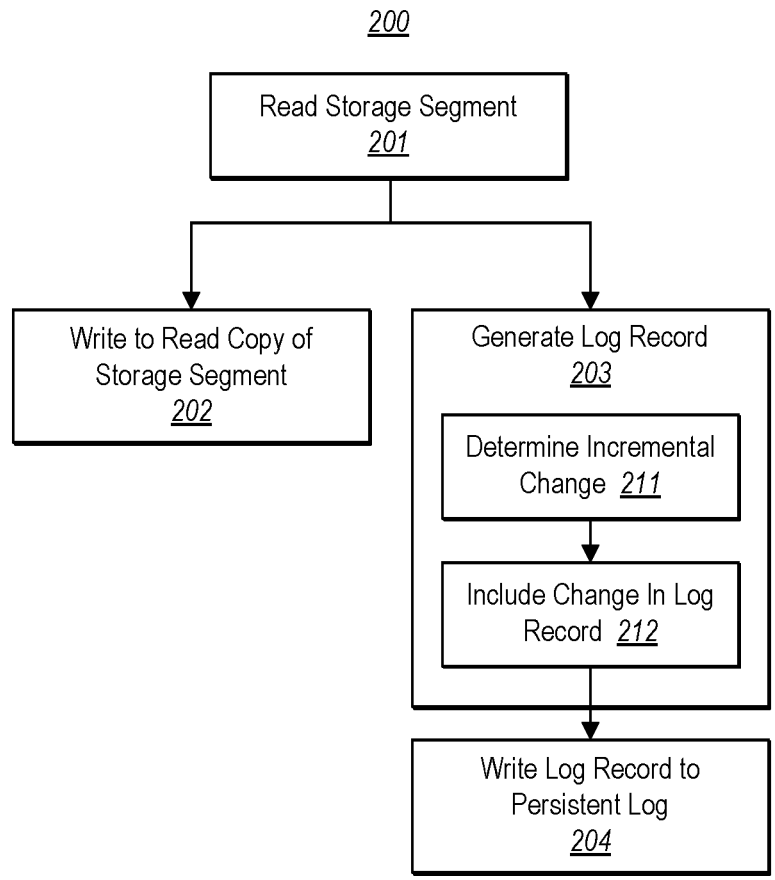
FIG. 2 illustrates a flowchart of a method for generating a log record and performing a write operation.

In particular, FIG. 2 illustrates a flowchart of a method 200 for generating a log record and performing a write operation. As an example, the method 200 may be performed by the primary compute system 110 of FIG. 1. The primary compute system first reads a particular storage segment (act 201). This ensures that a copy of the storage segment is brought into the cache of the primary compute system. The storage segment may have been previously read by the primary compute system, in which case that storage segment will already be within the cache of the primary compute system. Otherwise, the primary compute system performs a read operation from the respective storage segment server that contains the storage segment that is to be written to. In FIG. 1, for instance, the primary compute system 110 reads (as represented by arrow 102) a storage segment (e.g., a page) from the storage segment server 142).

Figure 3:
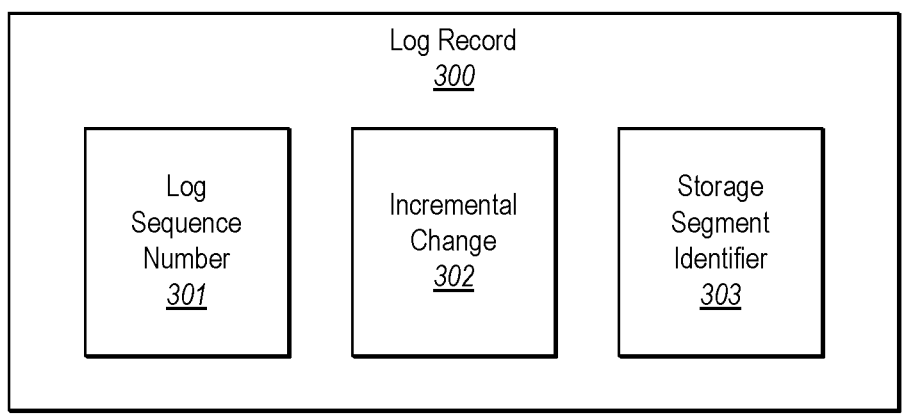
FIG. 3 illustrates a log record that includes a log sequence number, a description of the incremental change to a storage segment, as well as the storage segment identifier to which that change was applied.

The primary compute system then writes to the read (e.g., cached) copy of that storage segment (act 202). Also, to create a log record of that write operation (act 203), the incremental change made or to be made as part of that write operation is determined (act 211). The primary compute system then creates a log record that includes the incremental change (act 212). For instance, FIG. 3 illustrates a log record 300 that includes a log sequence number 301, description of the incremental change 302, as well as the storage segment identifier 303 to which that change was applied. A log sequence number is a number that uniquely identifies a log record, and that represents a position of the log record within the log. The log sequence number is typically a monotonically increasing number such that the higher the log sequence number, the more recent the log record was placed within the log. The log record is written in a persistent log (act 204). For instance, in FIG. 1, as represented by arrow 101A, the primary compute system 110 writes the log record (e.g., log record 300) into the persistent log 131.

Figure 4:
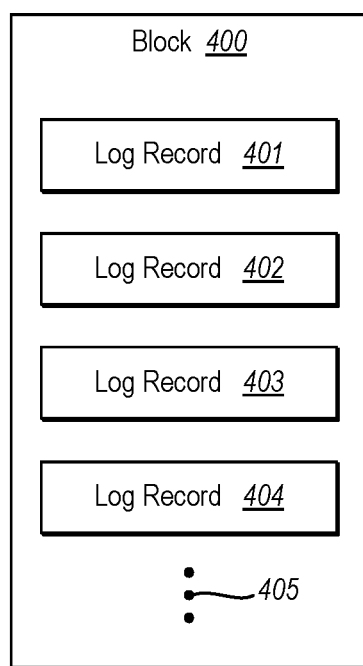
FIG. 4 illustrates a block populated with multiple log records.

In one embodiment, the log records are organized into blocks. A block is a unit of storage that may be written to and read from atomically (i.e., at one time—such that the write or read is either completed for the entire block, or abandoned with no write being performed at all). A typical block size will be constant in a computing system, but example block sizes include 512 and 4096 bytes. Because a log record may be much smaller than a block, a block may include multiple log records. FIG. 4 illustrates a block 400 populated with multiple log records 401, 402, 403 and 404. As an example, the log record 300 of FIG. 3 might be the log record 402 of FIG. 4. The ellipsis 405 represents that the block 400 may include any number of blocks that are suitable given the size of a log record, and the size of the block. Each log record may be said to occupy a "slot" within the block. When writing the log record to the persistent log (as represented by arrow 101A of FIG. 1 and act 204 of FIG. 2), it may be a block of log records (such as block 400) that is written to the persistent log. Thus, the primary compute system 110 may wait for some number of log records to be generated before writing the log records as a block to the persistent log 131.

Returning to FIG. 1, the environment 100 also include a log service computing system 132. The log service computing system 132 may be a physical computing system, such as the computing system 700 described below with respect to FIG. 7. Alternatively or in addition, the log service computing system 132 may be a virtual machine, or perhaps may be an executable component, such as the executable component 706 described below with respect to FIG. 7. The log service computing system 132 helps write operations that are performed and logged by the primary computing system 110 to be propagated to the appropriate storage segment server 140, and to the secondary compute system(s) 120.

The environment 100 also includes multiple storage segment servers 140. The data operated upon by the application 110A on the primary compute system 110 is spread across the storage segment servers 140. Each storage segment server is thus for servicing storage segments corresponding to only a portion of the user data. Storage segments may, for instance, be pages of data. Each page of data may include multiple blocks.

For instance, as represented by arrow 161 in FIG. 1, storage segment server 141 performs data operations for only the assigned storage segment set 151. Furthermore, arrow 162 represents that storage segment server 142 performs data operations only for its assigned storage segment set 152, arrow 163 represents that storage segment server 143 performs data operations for only its assigned storage segment set 153, and arrow 164 represents that storage segment server 144 performs data operations for only its assigned the storage segment set 154. The ellipses 145 and 155 represent that the principles described herein are not limited to the number of storage segment servers.

However, identifying which storage segment server is assigned to perform data operations for a given storage segment is simpler if the storage segments (e.g., pages) assigned to any given storage segment are contiguous within the address space of the user data. Furthermore, read operations on continuous storage segments may be more efficiently performed on contiguous storage segments since a single read operation may be issued to return potentially many contiguous storage segments that are contiguous in the address space of the user data. In one embodiment, the user data is represented within a storage service 170 that underlies the storage segment servers 140. The user data distributed across the storage segment servers 140 may maintain the same layout and structure as the user data on the storage service 170.

The storage segment sets 151 through 155 are illustrated collectively as storage segment sets 150. When the storage segment servers 140 store their respective data using the storage service 170 offered by a cloud computing environment, the need to perform size of data operations is eliminated. For instance, such size of data operations may be the performance of a full backup of the entirety of the data. Conventionally, the primary compute system and each of the secondary compute systems would have to perform a full backup separately, by transferring data over a network. Thus, the principles described herein allow for excellent capability to scale the data upwards. However, a copy of the storage segment sets 151 through 155 may also be kept in a cache at each of the respective storage segment servers 141 through 145. This allows for rapid access to the storage segments. But if the storage segment is lost in the cache of the storage segment servers 140 (or even if one of the storage segment servers itself goes down), the storage segment is still available in the storage service 170 in the cloud computing environment.

The volume 135 may be mounted to multiple computing systems. For instance, that single mounted volume 135 may be included within a drive that is mounted to the primary compute system 110 as a read and write volume, while being mounted to the secondary compute system(s) 120 as a read-only volume. Since there is only one computing system mounted to that volume as a write volume, multiple computing systems may be mounted to the volume 135 without risk of corruption of data due to competing or inconsistent write operations. The volume might be within a cloud computing environment as part of a cloud store service. For instance, rather than read log records from the broker 133, the storage segment servers 140 and/or the secondary compute systems may read log records directly from the persistent log 133.

Figure 5:
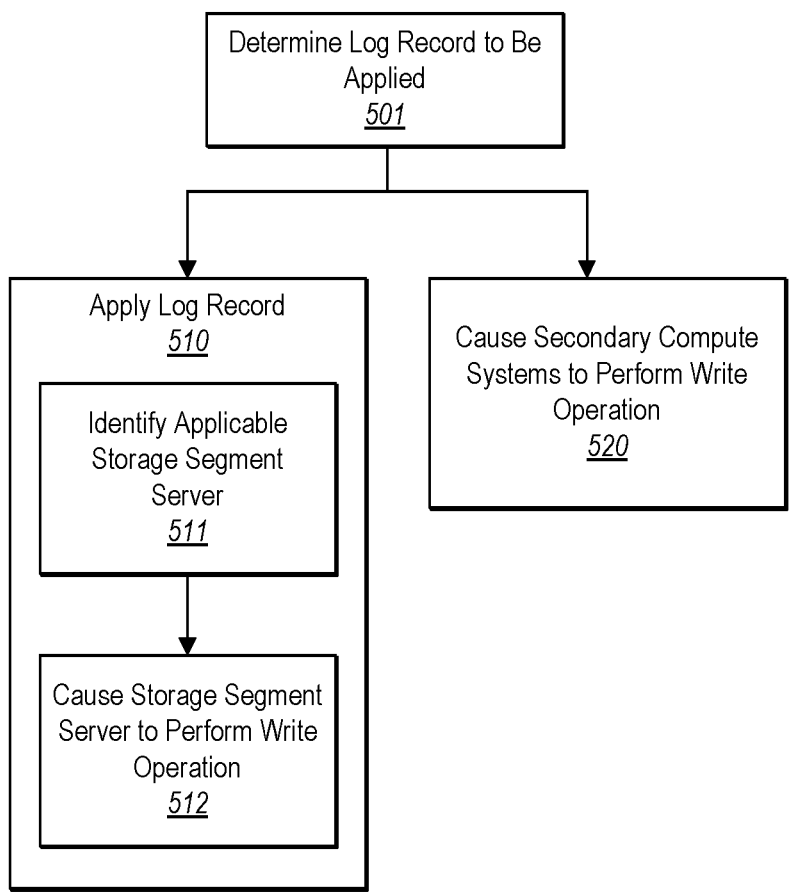
FIG. 5 illustrates a flowchart of a method for applying a log record to storage segments.

FIG. 5 illustrates a flowchart of a method 500 for applying a log record to storage segments in accordance with the principles described herein. The method 500 may be performed for each of multiple log records that are identified as to be applied. Thus, the performance of method 500 many times allows the log to be applied to appropriate storage segments. That is the write operations specified in the log records are applied to the storage segments within the appropriate storage segment servers. As an example, the method 500 may be performed by the log service computing system 132 of FIG. 1. The method 500 may be performed within the environment 100 of FIG. 1, in order to apply the log record 300 of FIG. 3. Accordingly, FIG. 5 will now be described with respect to the FIGS. 1 and 3.

The method 500 is initiated upon determining that a particular log record is to be applied (act 501). For instance, that particular log record may be the log record 300 of FIG. 3. In response to identifying that the particular log record is to be applied (act 501), the particular log record is applied (act 510). This may be done with respect to the particular storage segment server that corresponds to the storage segment. This may also be done with respect to each secondary compute system.

Accordingly, the applying of the log record (act 510) includes identifying a particular storage segment server that is assigned to a particular set of storage segments that includes the particular storage segment to be written to in the particular write operation (act 511). In the case in which the set of storage segments are contiguous in an address space, the assignment of the set of storage segments to each storage segment server may be made to align with the most significant bits of the storage segment identifier. For instance, suppose that the storage segment identifiers range from binary 00000,00000 (comma added every five bits to assist the reader) to binary 01101,01111. In that case, there might be seven storage segment servers, one for storage segments having identifiers with the four most significant bits being 0000, another for the storage segments having identifiers with the four most significant four bits being 0001, and so on, until the seventh storage segment for storage segments having identifiers with the four most significant bits being 0110. Thus, determining which storage segment server is assigned to store a particular storage segment becomes an efficient computation. The log service computing system 132 may thus determine the appropriate storage segment server for the log record 300 based on the storage segment identifier 303.

Then, the particular storage segment server is caused to perform the particular write operation to the particular storage segment designated in the particular log record (act 512). For instance, the log service computing system 132 may provide (e.g., as represented by arrow 103B) the log record 300 to the appropriate storage segment server (say storage segment server 142). This would represent the completion of the write operation that begin when the primary compute system 110 read (as represented by the arrow 102) that storage segment from the storage segment server.

In one example, this notification (represented by arrow 103B) is not pushed to the appropriate storage segment server. Instead, it is up to the storage segment server to make inquiry of the log service computing system 132 for the appropriate log records. Thus, the providing of the appropriate log record to the storage segment server may be in response to the request from the particular storage segment server. Thus, the storage segment server 143 assigned to the storage segment written to may be notified of the write operation after the storage segment server 143 asks for applicable log entries (as represented by arrow 103A).

The log service computing system 132 may have a broker component 133 thereon that handles processing of incoming requests for log records. The broker 133 may be an executable component on the log service computing system. For instance, the broker 133 may be structured as described below for the executable component 706 of FIG. 7.

The broker 133 may provide log records not one at a time, but perhaps one block at a time. For instance, if the broker 133 determines that there are any log records (e.g., any of log records 401, 402, 403, 404 or 405) within a block of log records (e.g., block 400) that have a storage segment identifier within the set of storage segments assigned to a particular storage segment server, the broker 133 may send the entire block to the particular storage segment server.

In addition, the broker 133 may ensure that the log record is not communicated to any entity until the log service computing system 132 has been notified that the log record has been securely written into the persistent log 131 (i.e., the log record has become public). This helps the recovery process be consistent. During recovery, the recovery uses the persistent log 131 to determine what operations have been completed. If other components in the system (e.g., a secondary compute system or a storage segment server) has performed operations that the persistent log 131 is not aware of, then the recovery will fail to achieve a reliable state. The user data then becomes ambiguous, and thus corrupt.

The broker 133 may also perform other tasks. For instance, the broker 133 may expect that the primary compute system 110 (which is the source of the generated log records) is unreliable. In order to compensate for that, the broker 133 may implement different policies for deduplicating log records that have been received multiple times from the primary compute system 110. The broker 133 may perform this deduplication by keeping track of the primary compute system generations and by retaining only the latest generation for all log records. The broker 133 may also expect log records to get lost and compensates for that by filling in log records that were missed (e.g., by reading from the fixed-size log portion 601) described below.

Returning to the method 500 of FIG. 5, the log service computing system also causes a secondary compute system to perform the particular write operation on a copy of the storage segment at the secondary compute system (act 520). This may also be performed by communicating (as represented by arrows 104B and 105B in FIG. 1) the log record (e.g., log record 300) to each secondary compute systems 121 and 122. While the log record may be pushed to the secondary compute systems 120, the broker 133 may likewise handle requests for log records (as represented by arrows 104A and 105A) from the secondary compute systems 120. Again, the log records may be provided as a block. As a reminder, the broker 133 may ensure that log records are not communicated to the secondary compute systems 120 unless the log record is already confirmed as written to the persistent log 131. As one possible optimization, the secondary compute system may also perhaps ignore the log record if it is for writing to a storage segment that is not already cached (and thus would cause a read from a storage segment server). In that case, if the secondary compute system was to use that storage segment later, the secondary compute node may read that storage segment from the storage segment server (which already has the write of the skipped log record applied).

Figure 6:
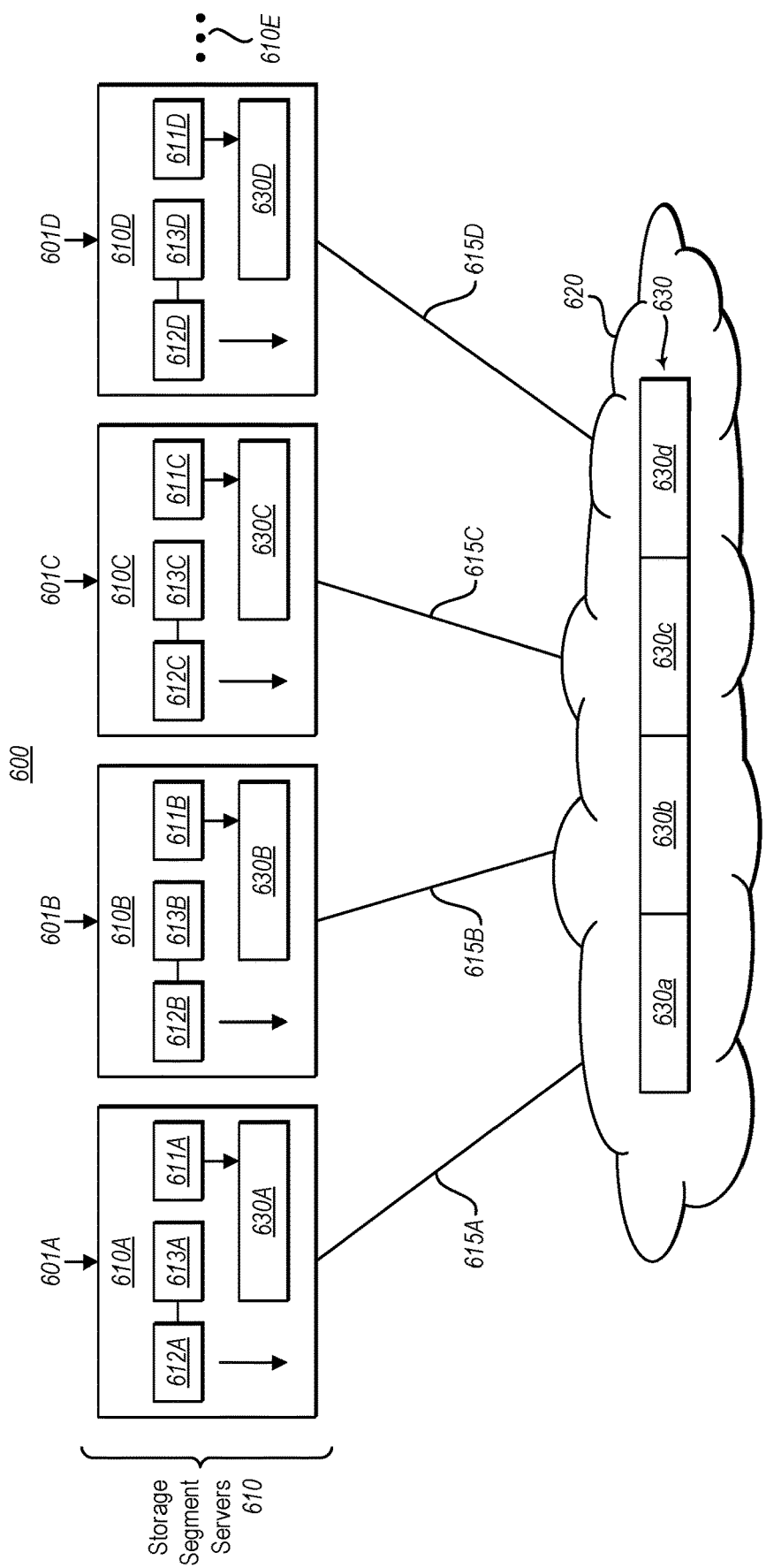
FIG. 6 illustrates an environment in which there are storage segment servers that are selectively coupled to a cloud store service in accordance with the principles described herein.

FIG. 6 illustrates an environment 600 in which there are storage segment servers 610 that are selectively coupled to a cloud store service 620. The cloud store service 620 may be the cloud store service 170 of FIG. 1. Furthermore, the storage segment server 610 are illustrated as including four storage segment servers 610A through 610D, which represent examples of the storage segment servers 141 through 144, respectively, of FIG. 1. The selective coupling of each of the storage segment servers 610A through 610D to the cloud store service are represented by lines 615A through 615D, respectively. As an example, the coupling is "selective" in that either the respective storage segment server or cloud store service may select to decouple so that communication is no longer possible at least temporarily. Alternatively, the decoupling may be inadvertent due to a temporary problem with the communication channel between the storage segment server and the cloud store service. The ellipsis 610E represents that there may be more, and perhaps many more, (or even fewer) storage segment servers 610 within the environment 600.

The storage segment servers 610 collectively cover an address space 630 of use data. For instance, storage segment server 610A stores contiguous addresses 630A, storage segment server 610B stores contiguous addresses 630B, storage segment server 610C stores contiguous addresses 630C, and storage segment server 610D stores contiguous addresses 630D. Each of these contiguous address sets 630A through 630D correspond to a respective portion 630a through 630d of the contiguous storage segments 630 storing the user data within the cloud store service 620. Thus, the storage segments within each storage segment servers are contiguous and match address space of responding storage segments in the cloud store service. Since the address space 630 within the collective storage segment servers 610 match the geometry of the address space 630 within the cloud store service 620, the storage segments of the storage segment servers are a covering cache for the corresponding storage segments in the cloud store service. A read request against multiple contiguous storage locations within the address space 630 can thus likely be handled by a single read from one of the storage segment servers.

Each storage segment server has a corresponding storage segment write component that is configured to perform write operations to each of the storage segments in the storage segment server. The storage server write component performs write operations on their respective contiguous address after the primary compute system performs a write operation and logs a respective log record in the persistent log 131. In that case the storage segment server requests the log record from the log service computing system 132, and at some point receives the log record. This receiving of log records is represented by arrows 601A through 601D in FIG. 6. Recall back to FIG. 1, in which the storage segment server 143 requested (as represented by arrow 103A) the log record, and received the log record (as represented by arrow 103B).

In an embodiment in which the storage segment server receives an entire block of log records, some log records may be for operations performed on storage segments of the storage segments assigned to that storage segment server, and some will not. In that case, the storage segment write component may verify that the log record is applicable for the corresponding storage segment write component. If the log record is not applicable to any of the storage segments of the storage segment server, then the storage segment write component may simply ignore that particular log record.

Each storage segment server also has a corresponding cloud store write component that initiates corresponding write operations to the cloud store service with the aim that the storage segments in the cloud store service 620 will move towards the same content as the content stored within the corresponding storage segments in the respective storage segment server 610. For instance, storage segment server 610A has storage segment write component 611A that writes to the storage segments 630A, and a corresponding cloud store write component 612A that initiates corresponding write operations to storage segments 630a within the cloud store service 620. Similarly, storage segment server 610B has storage segment write component 611B that writes to the storage segments 630B, and a corresponding cloud store write component 612B that initiates corresponding write operations to storage segments 630b within the cloud store service 620. Likewise, storage segment server 610C has storage segment write component 611C that writes to the storage segments 630C, and a corresponding cloud store write component 612C that initiates corresponding write operations to storage segments 630c within the cloud store service 620. Finally, storage segment server 610D has storage segment write component 611D that writes to the storage segments 630D, and a corresponding cloud store write component 612D that initiates corresponding write operations to storage segments 630d within the cloud store service 620.

Each of the cloud store write components also keeps track of which operations that have been performed on storage segments on the respective storage segment server, but for which the corresponding operation has not yet been verified as complete in the cloud store service. For instance, cloud store write components 612A through 612D each having respective tracking data 613A through 613D that includes operations that have been performed on the storage segments on the storage segment server, but for which the corresponding operation has not yet been verified as complete in the cloud store service. The cloud storage write component is configured to reattempt such write operations in the cloud storage service. Each of the storage segment write components 611 and the cloud store write components 612 may be structured as described below for the executable component 706 of FIG. 7.

In one embodiment, there may also be a seeding component. The seeding component operates to create a new storage segment server (e.g., should a storage segment server fail) and copies the storage segments from the cloud storage to the local cache. During seeding, the storage segment server maintains information on which portions of the data have already been stored in the cache, and is able to determine which read requests from the compute systems can be serviced from the cache, and which from the cloud storage. The seeding component may make predictions about what read requests may be received in the future for the storage segment server that was started up. Thus, the seeding component may significantly reduce the amount of time that it takes for a new storage segment server to become responsive to read requests, as compared to simply waiting for the entirety of the storage segment server to be populated with all of its storage segments.

Because the principles described herein operate in the context of a computing system, a computing system will be described with respect to FIG. 7. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
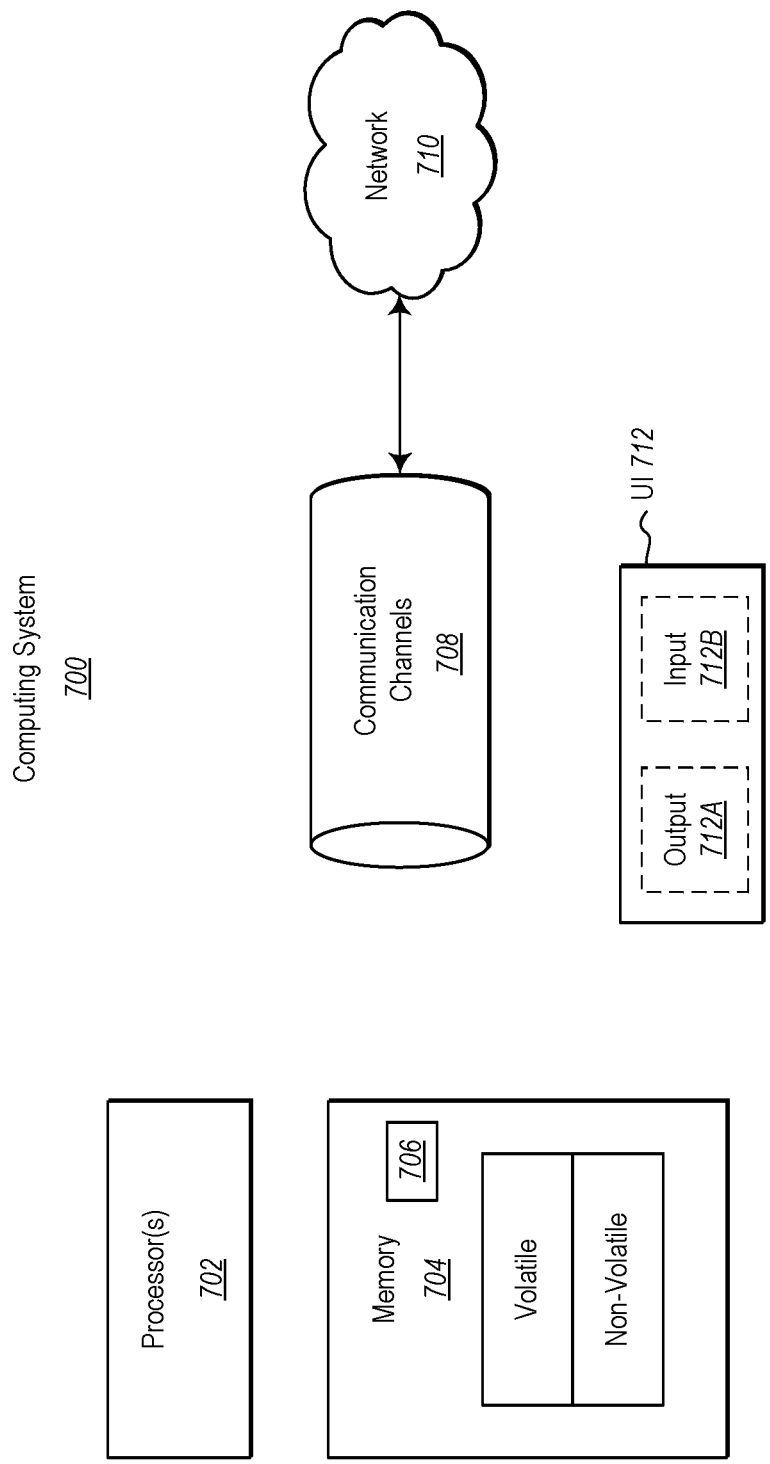
FIG. 7 illustrates an example computer system in which the principles described herein may be employed.

As illustrated in FIG. 7, in its most basic configuration, a computing system 700 typically includes at least one hardware processing unit 702 and memory 704. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface 712 for use in interfacing with a user. The user interface 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, virtual reality, and so forth. Examples of input mechanisms 712B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware storage devices, comprising:
a plurality of storage segment servers, comprising a particular storage segment server that is selectively coupled to a cloud store service, and that comprises:
a plurality of storage segments that are contiguous in an address space and that matches the address space of a corresponding plurality of storage segments in the cloud store service, the plurality of storage segments being logically contiguous in the address space to at least one other plurality of storage segments of a different storage segment server of the plurality of storage segment servers, wherein the at least one other plurality of storage segments of the different storage segment server matches the address space of at least one other corresponding plurality of storage segments in the cloud store service, such that the corresponding plurality of storage segments within the cloud store service and the at least one other corresponding plurality of storage segments within the cloud store service are logically contiguous within the cloud store service; and
computer-executable instructions that are executable to configure the system to instantiate or operate the plurality of storage segment servers; and
one or more processors configured to execute the computer-executable instructions to configure the system to perform at least the following:
perform write operations to each of the plurality of storage segments in the particular storage segment server;
initiate corresponding write operations to the cloud store service and verify completion of the corresponding write operations to the cloud store service, and keep track of which operations that have been performed on the plurality of storage segments on the particular storage segment server, but for which the corresponding operation has not yet been verified as complete in the cloud store service;
instantiate a new storage segment server;
initiate copying data from at least one of the respective corresponding plurality of storage segments in the cloud store service to the new storage segment server;
receive a read request for at least a portion of the data while copying the data;
determine whether the at least a portion of the data has been copied to the new storage segment server;
in response to determining that the at least a portion of the data has been copied to the new storage segment server, respond to the read request using the new storage segment server; and
in response to determining that the at least a portion of the data has not been copied to the new storage segment server, respond to the read request using the at least one of the respective corresponding plurality of storage segments in the cloud store service.

2. The system of claim 1, the plurality of storage segments of the particular storage segment server being a covering cache for the corresponding plurality of storage segments in the cloud store service.

3. The system of claim 1, the computer-executable instructions being operable to configure the system to reattempt write operations in the cloud storage server that correspond to write operates that have been performed on the plurality of storage segments on the particular storage segment server, but for which the corresponding operation has not yet been verified as complete in the cloud store service.

4. The system of claim 1, each of the plurality of storage segment servers comprising:
 a respective plurality of storage segments that are contiguous in the address space and that matches the address space of a respective corresponding plurality of storage segments in the cloud store service;
 wherein the computer executable instructions are operable to configure the system to:
  perform write operations to each of the respective plurality of storage segments in the respective storage segment server; and
  initiate corresponding write operations to the cloud store service and verify completion of the corresponding write operations to the cloud store service, and keep track of which operations that have been performed on the plurality of storage segments on the storage segment server, but for which the corresponding operation has not yet been verified as complete in the cloud store service.

5. The system of claim 1, the write operations being specified in log records obtained for the particular storage segment server, the log records having been performed by a primary compute system.

6. The system of claim 1, the computer-executable instructions being operable to configure the system to:
 request log records that have been performed by a primary compute system; and
 determine whether the log record corresponds to a write operation for a storage segment that is within the plurality of storage segments, and if so, to perform the write operation on the storage segment.

7. The system of claim 1, the computer-executable instructions being operable to configure the system to:
 request blocks of log records that have been performed by a primary compute system; and
 perform at least some of the write operations specified in the log records of the requested blocks.

8. The system of claim 1, the computer-executable instructions being operable to configure the system to:
 request blocks of log records that have been performed by a primary compute system; and
 determine whether each log record corresponds to a write operation for a storage segment that is within the plurality of storage segments, and if so, to perform the write operation on the storage segment.

9. One or more hardware storage devices having thereon computer-executable instructions that are structured such that, when executed by one or more processors of a computing system, cause the computing system to instantiate or operate the following:
 a storage segment write component that is configured to perform write operations to each of a plurality of storage segments assigned to a particular storage segment server of a plurality of storage segment servers, the particular storage segment server being selectively coupled to a cloud store service, the plurality of storage segments being contiguous in an address space and that matches the address space of a corresponding plurality of storage segments in the cloud store service, the plurality of storage segments being logically contiguous in the address space to at least one other plurality of storage segments of a different storage segment server of the plurality of storage segment servers, wherein the at least one other plurality of storage segments of the different storage segment server matches the address space of at least one other corresponding plurality of storage segments in the cloud store service, such that the corresponding plurality of storage segments within the cloud store service and the at least one other corresponding plurality of storage segments within the cloud store service are logically contiguous within the cloud store service;
 a cloud storage write component that initiates corresponding write operations to the cloud store service and verifies completion of the corresponding write operations to the cloud store service, and keeps track of which operations that have been performed on the plurality of storage segments on the storage segment server, but for which the corresponding operation has not yet been verified as complete in the cloud store service; and
 a seeding component that, in response to detecting failure of a storage segment server of the plurality of storage segment servers:
  instantiates a new storage segment server;
  initiates copying data from at least one of the respective corresponding plurality of storage segments in the cloud store service to the new storage segment server;
  receives a read request for at least a portion of the data while copying the data;
  determines whether the at least a portion of the data has been copied to the new storage segment server;
  in response to determining that the at least a portion of the data has been copied to the new storage segment server, responds to the read request using the new storage segment server; and
  in response to determining that the at least a portion of the data has not been copied to the new storage segment server, responds to the read request using the at least one of the respective corresponding plurality of storage segments in the cloud store service.

10. The one or more hardware storage devices of claim 9, the plurality of storage segments of the particular storage segment server being a covering cache for the corresponding plurality of storage segments in the cloud store service.

11. The one or more hardware storage devices of claim 9, the cloud storage write component configured to reattempt write operations in the cloud storage server that correspond to write operates that have been performed on the plurality of storage segments on the particular storage segment server, but for which the corresponding operation has not yet been verified as complete in the cloud store service.

12. The one or more hardware storage devices of claim 9, each of the plurality of storage segment servers comprising:
 a respective storage segment write component that is configured to perform write operations to each of a respective plurality of storage segments assigned to the respective storage segment server, the respective plurality of storage segments being contiguous in the address space and that matches the address space of a corresponding plurality of storage segments in the cloud store service; and a respective cloud storage write component that initiates corresponding write operations to the cloud store service and verifies completion of the corresponding write operations to the cloud store service, and keep track of which operations that have been performed on the plurality of storage segments on the storage segment server, but for which the corresponding operation has not yet been verified as complete in the cloud store service.

13. The one or more hardware storage devices of claim 9, the particular storage segment server configured to request log records that have been performed by a primary compute system, the write component configured to perform write operations specified in the log records.

14. The one or more hardware storage devices of claim 9, the particular storage segment server configured to request log records that have been performed by a primary compute system, the write component configured to determine whether the log record corresponds to a write operation for a storage segment that is within the plurality of storage segments, and if so, to perform the write operation on the storage segment.

15. The one or more hardware storage devices of claim 9, the particular storage segment server configured to request blocks of log records that have been performed by a primary compute system, the write component configured to perform at least some of the write operations specified in the log records of the requested blocks.

16. The one or more hardware storage devices of claim 9, the particular storage segment server configured to request blocks of log records that have been performed by a primary compute system, the write component configured to determine whether each log record corresponds to a write operation for a storage segment that is within the plurality of storage segments, and if so, to perform the write operation on the storage segment.

17. A system, comprising:
one or more hardware storage devices, comprising:
a plurality of storage segment servers that collectively cover a contiguous address space of data, each of the plurality of storage segment servers comprising:
a respective plurality of storage segments that are contiguous in the address space and that matches the address space of a respective corresponding plurality of storage segments in a cloud store service, each respective plurality of storage segments matching geometry of the respective corresponding plurality of storage segments in the cloud store service and thereby enabling each respective plurality of storage segments to operate as a covering cache for the respective corresponding plurality of storage segments in the cloud store service for responding to read requests, each respective plurality of storage segments being logically contiguous in the address space to at least one other respective plurality of storage segments of a respective different storage segment server of the plurality of storage segment servers, wherein the at least one other respective plurality of storage segments of the respective different storage segment server matches the address space of at least one other respective corresponding plurality of storage segments in the cloud store service, such that the respective corresponding plurality of storage segments within the cloud store service and the at least one other respective corresponding plurality of storage segments within the cloud store service are logically contiguous within the cloud store service; and computer-executable instructions that are executable to configure the system to instantiate or operate the plurality of storage segment servers; and one or more processors configured to execute the computer-executable instructions to configure the system to perform at least the following:
perform write operations to each of the respective plurality of storage segments in the respective storage segment server;
initiate corresponding write operations to the cloud store service and verify completion of the corresponding write operations to the cloud store service, and keep track of which operations that have been performed on the plurality of storage segments on the storage segment server, but for which the corresponding operation has not yet been verified as complete in the cloud store service;
instantiate a new storage segment server;
initiate copying data from at least one of the respective corresponding plurality of storage segments in the cloud store service to the new storage segment server;
receive a read request for at least a portion of the data while copying the data;
determine whether the at least a portion of the data has been copied to the new storage segment server;
in response to determining that the at least a portion of the data has been copied to the new storage segment server, respond to the read request using the new storage segment server; and
in response to determining that the at least a portion of the data has not been copied to the new storage segment server, respond to the read request using the at least one of the respective corresponding plurality of storage segments in the cloud store service.

18. The system of claim 1, the write operations comprising a particular write operation to:
a set of the plurality of storage segments of the particular storage segment server, and
a separate set of the at least one other plurality of storage segments of the different storage segment server, wherein data written according to the particular write operation is logically contiguous in address space across the set of the plurality of storage segments of the particular storage segment server and the separate set of the at least one other plurality of storage segments of the different storage segment server.

19. The system of claim 1, the corresponding write operations comprising a corresponding particular write operation corresponding to the particular write operation, the corresponding particular write operation being to:
a set of the corresponding plurality of storage segments in the cloud store service, and
a separate set of the at least one other corresponding plurality of storage segments in the cloud store service, wherein corresponding data written according to the corresponding particular write operation is logically contiguous in corresponding address space across the set of the corresponding plurality of storage segments in the cloud store service and the separate set of the at least one other corresponding plurality of storage segments in the cloud service.

* * * * *